(12) United States Patent
Bhakta

(10) Patent No.: US 9,500,866 B2
(45) Date of Patent: Nov. 22, 2016

(54) NEAR DISPLAY AND IMAGING

(71) Applicant: Texas Instruments Incorporated, Dallas, TX (US)

(72) Inventor: Vikrant R. Bhakta, Dallas, TX (US)

(73) Assignee: TEXAS INSTRUMENTS INCORPORATED, Dallas, TX (US)

(\*) Notice: Subject to any disclaimer, the term of this patent is extended or adjusted under 35 U.S.C. 154(b) by 0 days.

(21) Appl. No.: 14/245,651

(22) Filed: Apr. 4, 2014

(65) Prior Publication Data

US 2014/0306878 A1 Oct. 16, 2014

Related U.S. Application Data

(60) Provisional application No. 61/808,537, filed on Apr. 4, 2013.

(51) Int. Cl.
*G06F 3/01* (2006.01)
*G02B 27/01* (2006.01)

(52) U.S. Cl.
CPC ............ *G02B 27/017* (2013.01); *G06F 3/013* (2013.01); *G02B 2027/0138* (2013.01); *G02B 2027/0187* (2013.01)

(58) Field of Classification Search
CPC .......................................................... G06F 3/013
See application file for complete search history.

(56) References Cited

U.S. PATENT DOCUMENTS

| 6,456,262 | B1 | 9/2002 | Bell |
| 6,926,429 | B2 | 8/2005 | Barlow et al. |
| 7,091,867 | B2 | 8/2006 | Wenstrand |
| 7,331,671 | B2 | 2/2008 | Hammoud |
| 7,522,344 | B1 | 4/2009 | Curatu et al. |
| 8,125,558 | B2 | 2/2012 | Davis |
| 8,235,529 | B1 | 8/2012 | Raffle et al. |
| 2005/0007552 | A1 | 1/2005 | Fergason et al. |
| 2007/0040921 | A1 | 2/2007 | Davis et al. |
| 2007/0257870 | A1* | 11/2007 | Knipe ............................. 345/84 |
| 2010/0149073 | A1* | 6/2010 | Chaum et al. .................... 345/8 |
| 2010/0220291 | A1 | 9/2010 | Horning et al. |
| 2011/0058084 | A1 | 3/2011 | Hine et al. |
| 2011/0176797 | A1 | 7/2011 | Lu |
| 2011/0234859 | A1 | 9/2011 | Pao |

(Continued)

FOREIGN PATENT DOCUMENTS

| WO | 2011018655 | 2/2011 |
| WO | 2013025672 | 2/2013 |

OTHER PUBLICATIONS

C.Curatu, H. Hua & J. Rolland,"Projection-based head-mounted display with eye tracking capabilities," in Novel Optical Systems Designs and Optimization VIII, Proc. SPIE 5875, pp. 128-140 (2005).

H. Hong & C. Gao, "A compact eyetracked optical see-through head-mounted display," in Displays and Applications XXIII, Proc. SPIE 8288 (2012).

(Continued)

*Primary Examiner* — Kent Chang
*Assistant Examiner* — Scott Au
(74) *Attorney, Agent, or Firm* — Michael A. Davis, Jr.; Frank D. Cimino

(57) ABSTRACT

A method and device for eye gaze tracking has coincident display and imaging channel with shared field of view; a pupil forming/collimating subsystem that is part of the imaging channel; and a microdisplay that is part of the imaging channel. The method and device enable simultaneous display and eye tracking by using a pond of mirrors in a micromirror array.

14 Claims, 12 Drawing Sheets

(56) References Cited

U.S. PATENT DOCUMENTS

2012/0154595 A1 6/2012 Sassi
2013/0009853 A1 1/2013 Hesselink et al.
2013/0044042 A1 2/2013 Olsson et al.

OTHER PUBLICATIONS

T. Jarvenpaa & V Aaltonen, "Compact near-to-eye display with integrated gaze tracker," in Photonics in Multimedia II, Proc. SPIE 7001 (2008).

* cited by examiner

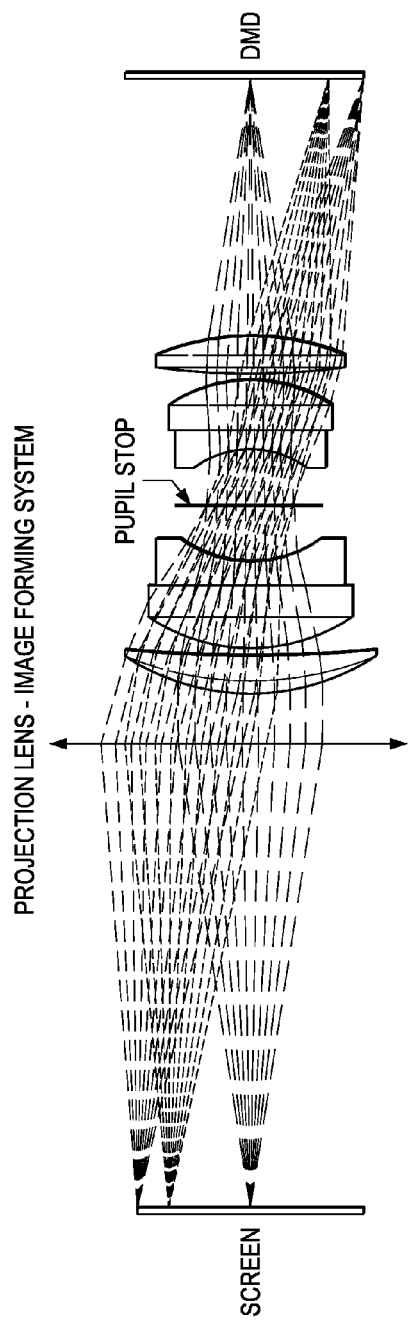
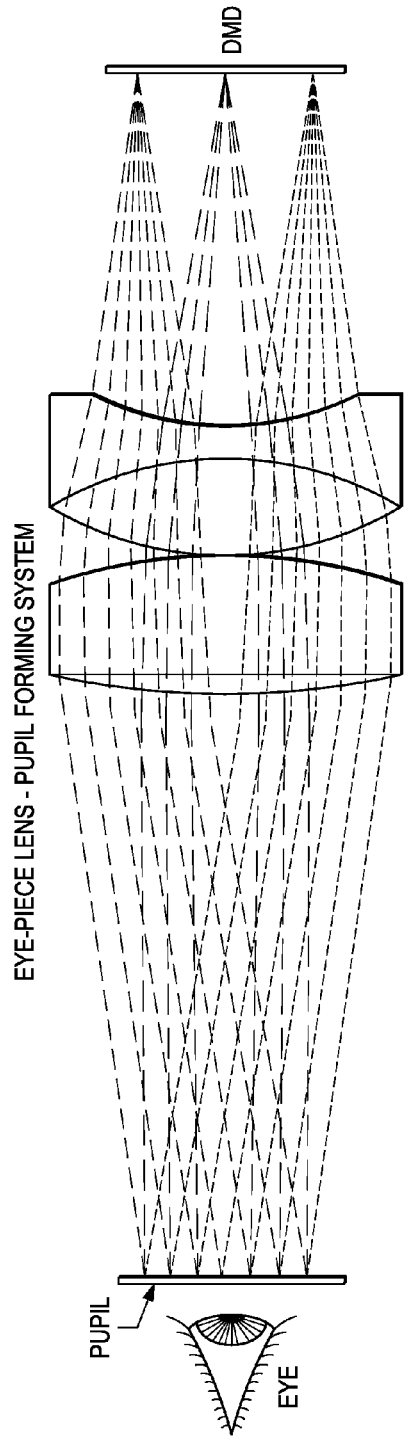
FIG. 4A
FIG. 4B

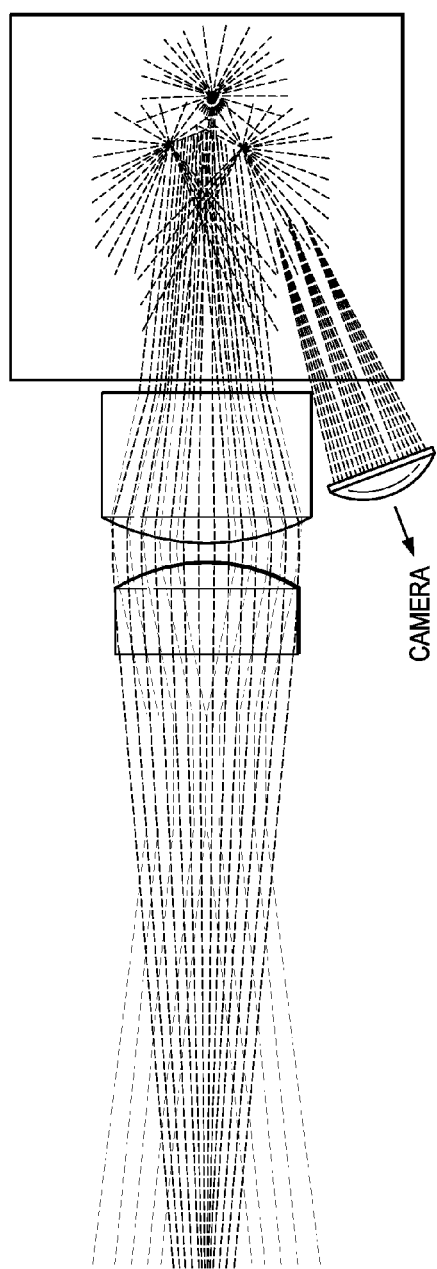
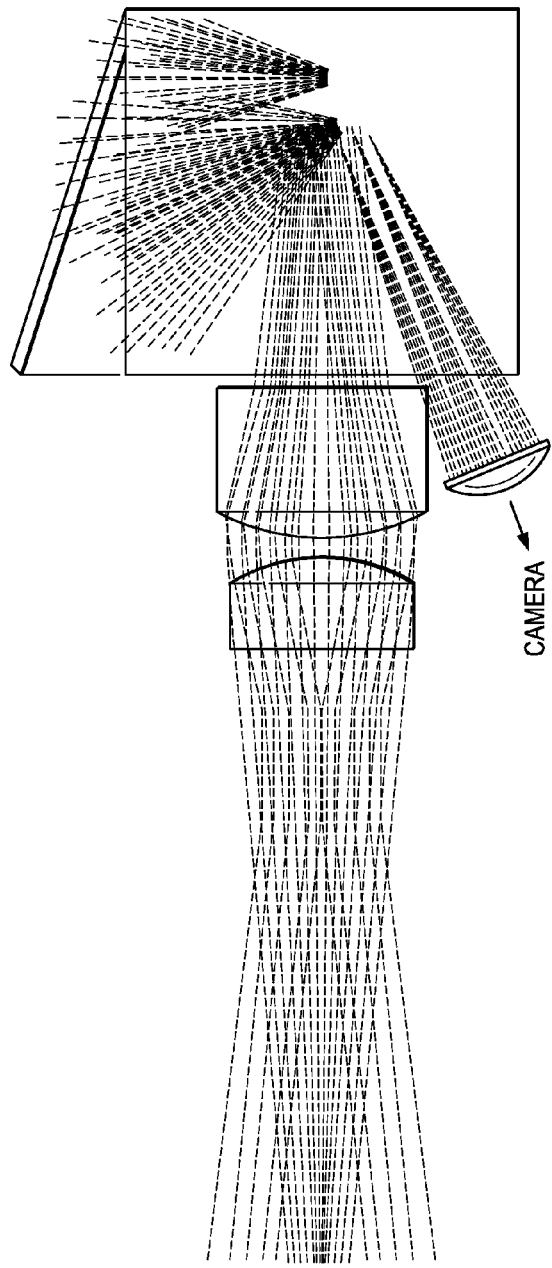

NEAR DISPLAY AND IMAGING

This application claims the benefit of Provisional Application No. 61/808,537, filed Apr. 4, 2013, the entirety of which is incorporated herein by reference.

This relates to eye tracking and interactivity solutions particularly suited for near eye display applications.

BACKGROUND

Examples of near eye display applications include head-mounted displays (HMDs) for wearable computers or the like, and Eyetap devices for recording activities as viewed by a user (so-called "souveillance" devices). Devices of this type, exemplified by devices such as associated with the Google™ Project Glass™ devices, may take the form of eyeglass frames worn by a user and including an optics element positioned for viewing directly by the eye. The devices may include a beam splitter to enable the eye to view displayed data superimposed either on an image directly viewed by the eye through a transparent display or on an image recorded by a camera having a same line of sight as the eye and reproduced on the display to provide a view similar to an otherwise directly viewed image. The effect may be like that of conventional heads-up displays (HUDs), such as historically used for aircraft landings, etc. In a simpler Eyetap implementation, display functionality may be omitted, and the beam splitter may simply serve to divert light to enable a camera to capture the same scene seen by the eye looking through the splitter.

The eyeglass frames supporting the HUD may be traditionally configured with a generally horizontal portion extending laterally across the face at the base of the eyebrows, supported centrally on the nose by nose pads and supported at each end on the ears by generally perpendicularly extending contoured temple pieces. The display optics may be located in an injection molded cavity formed integrally with the frame and have a viewing aperture located for viewing by at least one of the eyes as, for example, without requiring the user to look substantially away from the user's usual ambient environment viewing perspective. The frame may include eyeglass lenses or have no lenses.

In the case of a head-mounted display for a wearable computer or cellphone, the eyewear or other head-mounted display apparatus may also include some functionality for wired/wireless interconnection with a CPU and also for an interface capability. In some cases, the included functionality may include eye movement tracking capability to enable interactivity between the user and the display/computer elements. For example, in the case of display placement out of a direct forward line of sight of the user, eye movement tracking capability may be useful for implementing a circuit "wake-up" mode to activate selected features of the display only when a user is actually viewing the display and conserve power by entering a "sleep" mode when the user's eye is closed or directed elsewhere. Eye movement tracking may also be used as an intentional user input mechanism for implementing a sequence of commands in response to a corresponding sequence of eye movements. In cases where the eyewear includes elements for recording what the user sees, eye movement tracking may be used to direct the line of sight, focus point or lens aperture opening of the camera to follow the line of sight, focus point or pupil aperture opening of the viewer.

Power consumption and interactivity are two key factors in the design of apparatus for near eye display applications. Eye tracking addresses both these factors; however, conventionally implementations, such as those using liquid crystal on silicon (LCoS) display and liquid-crystal display (LCD) elements, have required the use of external cameras which has limited compactness and increased complexity of the systems.

Existing systems for near eye display systems are disclosed in U.S. Pat. No. 8,235,529; H. Hong & C. Gao, "A compact eyetracked optical see-through head-mounted display," in *Displays and Applications XXIII*, Proc. SPIE 8288 (2012); T. Järvenpää & V. Aaltonen, "Compact near-to-eye display with integrated gaze tracker," in *Photonics in Multimedia II*, Proc. SPIE 7001 (2008); and C. Curatu, H. Hua & J. Rolland, "Projection-based head mounted display with eye tracking capabilities," in *Novel Optical Systems Design and Optimization VIII*, Proc. SPIE 5875, pp. 128-140 (2005) (see also U.S. Pat. No. 7,522,344); the entireties of all of which are hereby incorporated herein by reference.

Additional background information is disclosed in U.S. Pat. Nos. 6,456,262; 6,926,429; 7,091,867; 7,331,671; 8,125,558; U.S. Patent Application Publication Nos. 2005/0007552; 2007/0040921; 2010/0220291; 2011/0058084; 2011/0176797; 2011/0234859; 2012/0154595; 2013/0044042; 2013/009853; and PCT Patent Application Publication Nos. WO 2011/018655 and WO 2013/025672; the entireties of all of which are also hereby incorporated herein by reference.

SUMMARY

Apparatus and methods are provided for improved near eye display systems, optical channels for display and imaging share at least portions of optical paths and/or elements.

In described embodiments, a micromirror array of a digital micromirror device (DMD) such as a Texas Instruments DLP® micromirror array device is employed to enable integration of eye movement tracking and display in a compact and robust configuration. In one implementation, simultaneous image display and eye tracking image capture is enabled through use of a first sub-array ("pond") of mirrors for directing eye images to a sensor and a second sub-array of mirrors for pixel color and intensity definition of the displayed image.

BRIEF DESCRIPTION OF THE DRAWINGS

FIGS. 4A and 4B illustrate building blocks of a waveguide based near eye display (NED) pupil forming system.

FIGS. 12, 13 and 14 illustrate optical paths for the same setup from different perspective.

DETAILED DESCRIPTION OF EXAMPLE EMBODIMENTS

Figure 1:
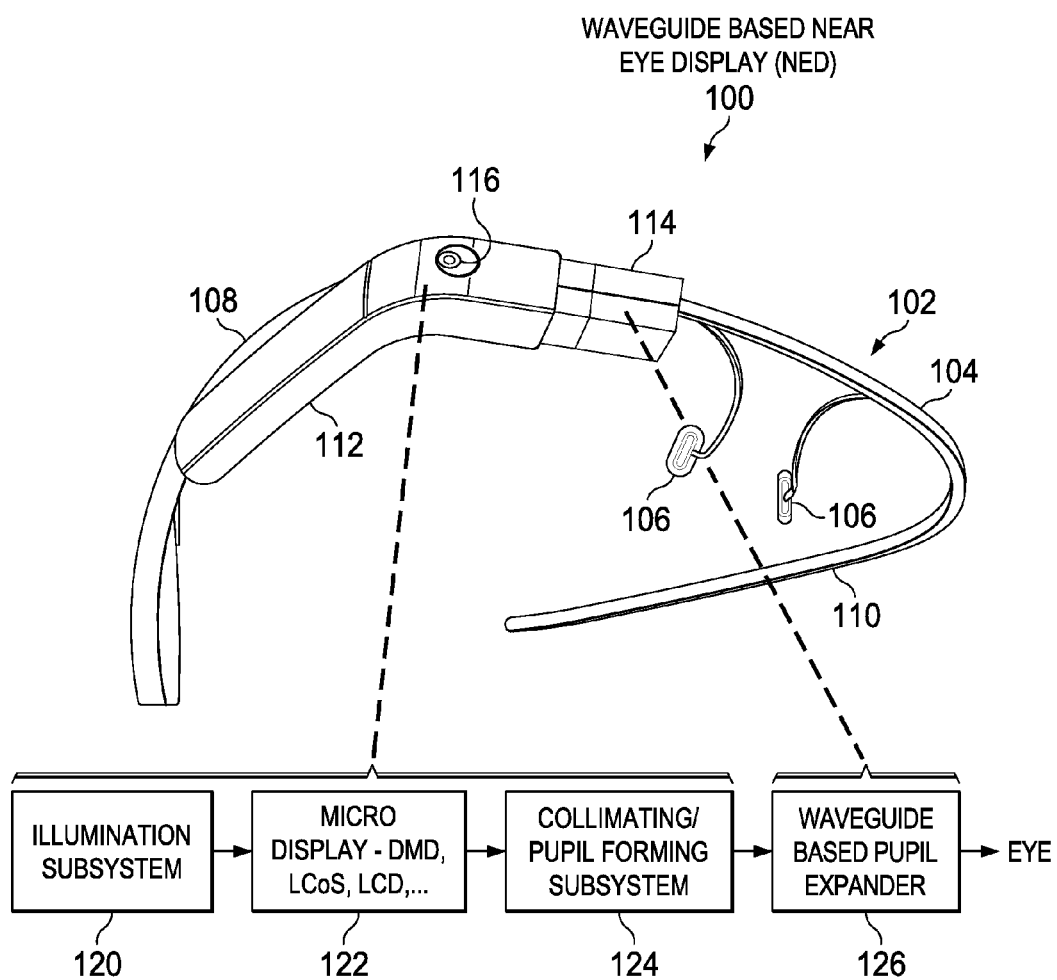
FIG. 1 illustrates a typical eyewear configuration for a head-mounted display (HUD) optical system application employing principles of the invention.

FIG. 1 illustrates a typical eyewear device head-mounted display (HUD) optical system in which principles of the invention may be applied. The HUD system takes the form of a waveguide based near-eye display (NED) 100. An eyeglass-like frame 102 supporting the HUD may be configured traditionally to have a generally horizontal portion 104 extending laterally across the face at the base of the eyebrows, supported centrally on the nose by nose pads 106 and supported at each end on the ears by generally perpendicular rearward extending contoured temple pieces 108, 110. Display image forming elements may be located within an internal cavity of a hollow injection molded housing 112 formed integrally with the frame 102, and light path directing elements 114 may be located next to an housing 112 on frame 112 to direct the formed image rearward from an image exit opening in housing 112 for viewing by at least one of the eyes as, for example, without requiring the user to look substantially away from the user's usual ambient environment viewing perspective. A forward facing entrance opening 116 in housing 112 serves for image capture by a field of view (FoV) of camera optics located within the housing cavity. Frame 102 may be configured with or without eyeglass lenses.

HUD 100 includes an illumination subsystem 120 which may utilize a laser, LED, hybrid laser-phosphor or other source for generation of illumination to illuminate a microdisplay 122 such as a digital micromirror device (DMD), a liquid crystal on silicon (LCoS) device, a liquid crystal display (LCD) or other spatial light modulator (SLM) located within the housing cavity integral with a temple of the eyewear. The illumination may take the form of a weighted time segment colored light sequence for establishing color contribution and intensity for individual image pixels on a pulse-width modulation (PWM) basis through selective ON/OFF switching of corresponding individual pixel light modulating elements of the SLM in synchronism with the received light. A collimating/pupil forming subsystem 124 comprising collimating and pupil forming optics directs the light from the spatial light modulator to a waveguide based pupil expander 126. The pupil expander 126 includes other optics (such as a prism or other optical beam path bending element) positioned on the eyewear externally of housing 112 that enable the eye of the user to view the image formed by the spatial light modulator.

Figure 2:
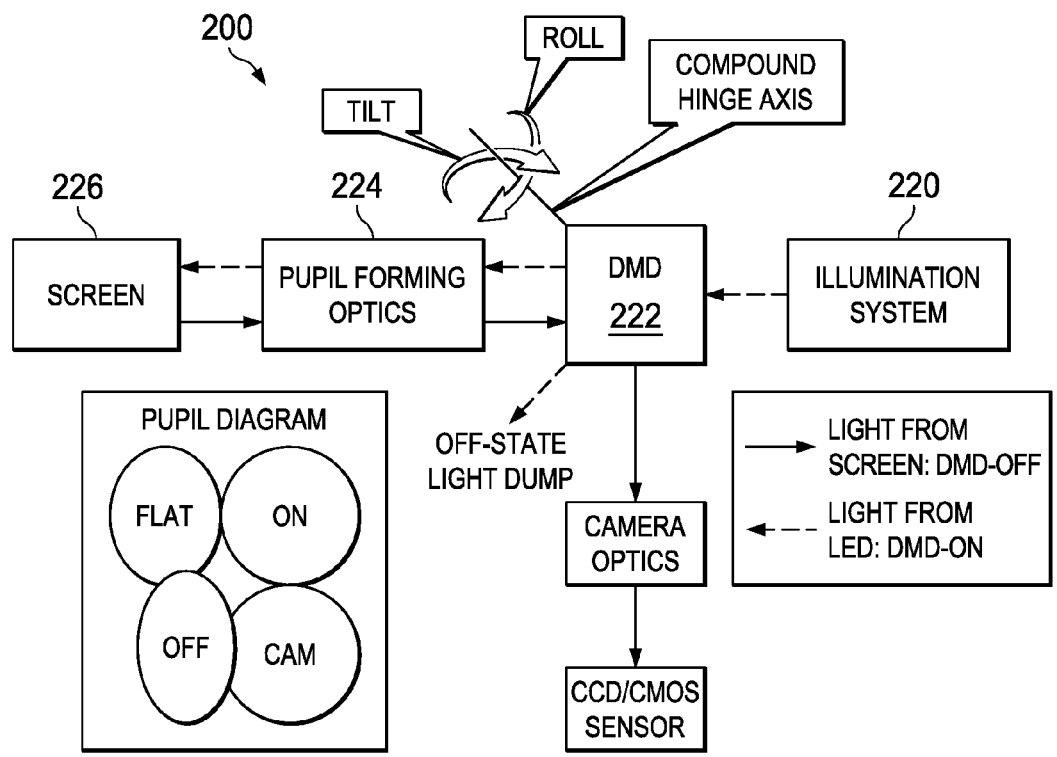
FIG. 2 is a block diagram of components usable in an implementation of the system illustrated in FIG. 1.
Figure 3A:
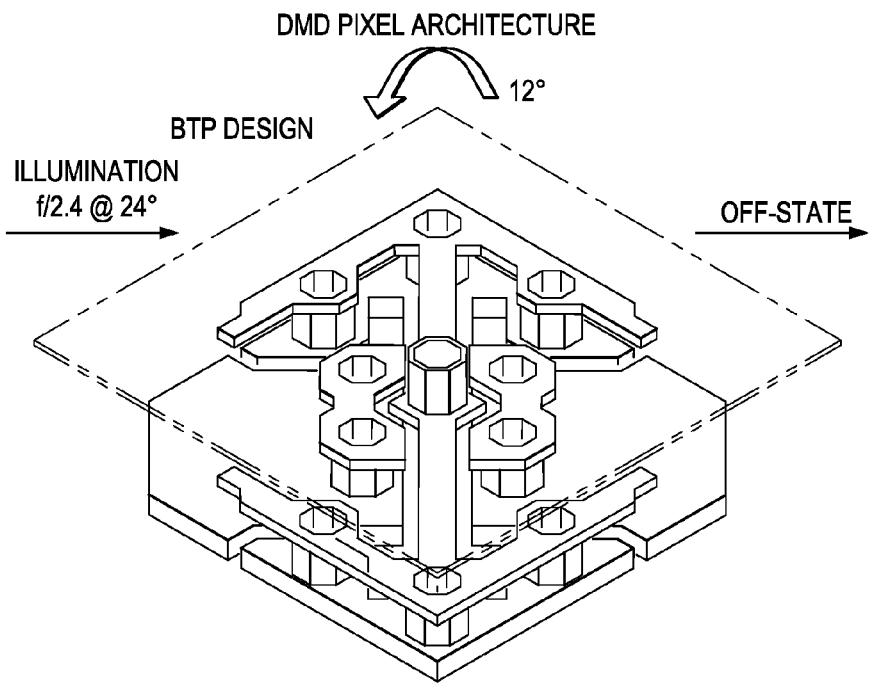
FIGS. 3A and 3B illustrate micromirror architectures usable in the implementation.
Figure 3B:
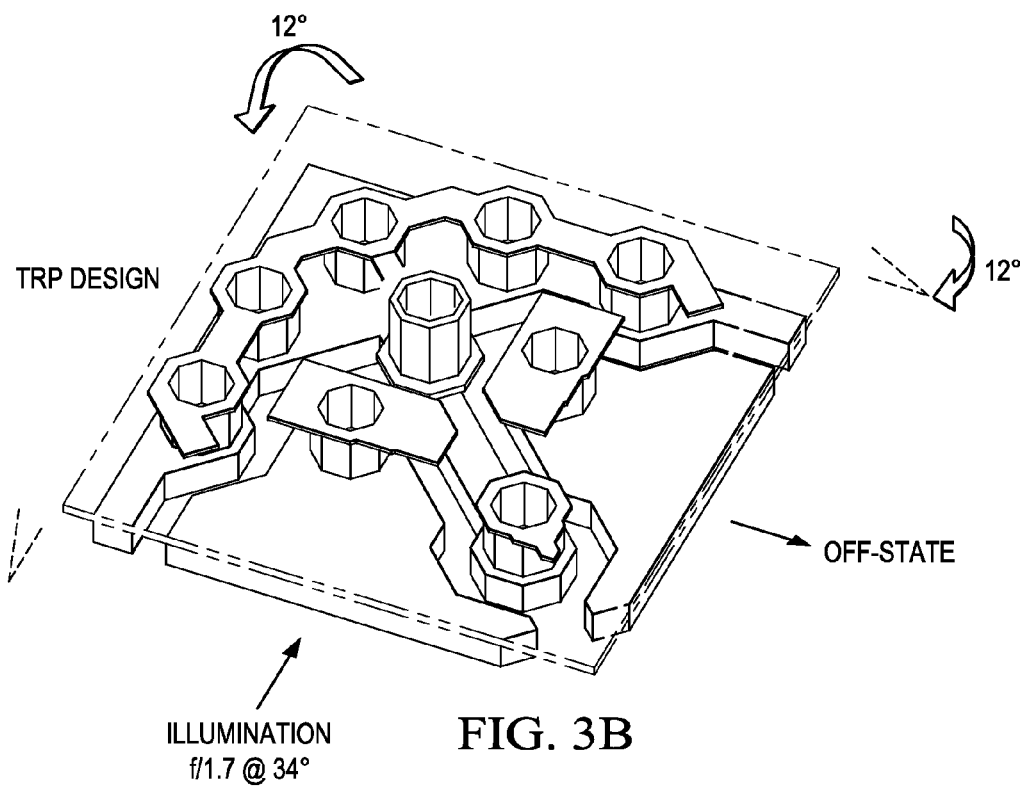

FIG. 2 illustrates an embodiment of an image display forming and eye tracking image capture system 200 suitable for use in the described HUD 100. The system 200 utilizes a spatial light modulator such as a Texas Instruments DLP® DMD which has an array of individually settable micromirrors. The layout shown in FIG. 2 utilizes a DMD having micromirrors with an architecture like that of the Texas Instruments DLP® device tilt-and-roll pixel (TRP) architecture illustrated in FIG. 3A. A more traditional architecture like that of the Texas Instruments DLP® binary+/−12° tilt pixel (BTP) architecture shown in FIG. 3B could, however, also be utilized. Additional details of the TRP pixel architecture are given in Provisional Application No. 61/823,304 filed May 14, 2013, the entirety of which is incorporated herein by reference.

The asymmetric tilt of the TRP™ pixel architecture may be advantageous for image capture because the OFF-state light path from the illumination system (e.g., LED) is travels along a different angular orientation that the OFF-state light path from screen. This enables light from the screen that is reflected from OFF-state mirrors to get captured by a CCD/CMOS sensor, with the camera capture and light projection modes sharing a same field of view (FoV).

FIGS. 4A and 4B illustrate building blocks of a waveguide based near eye display (NED) pupil forming system.

Figure 5:
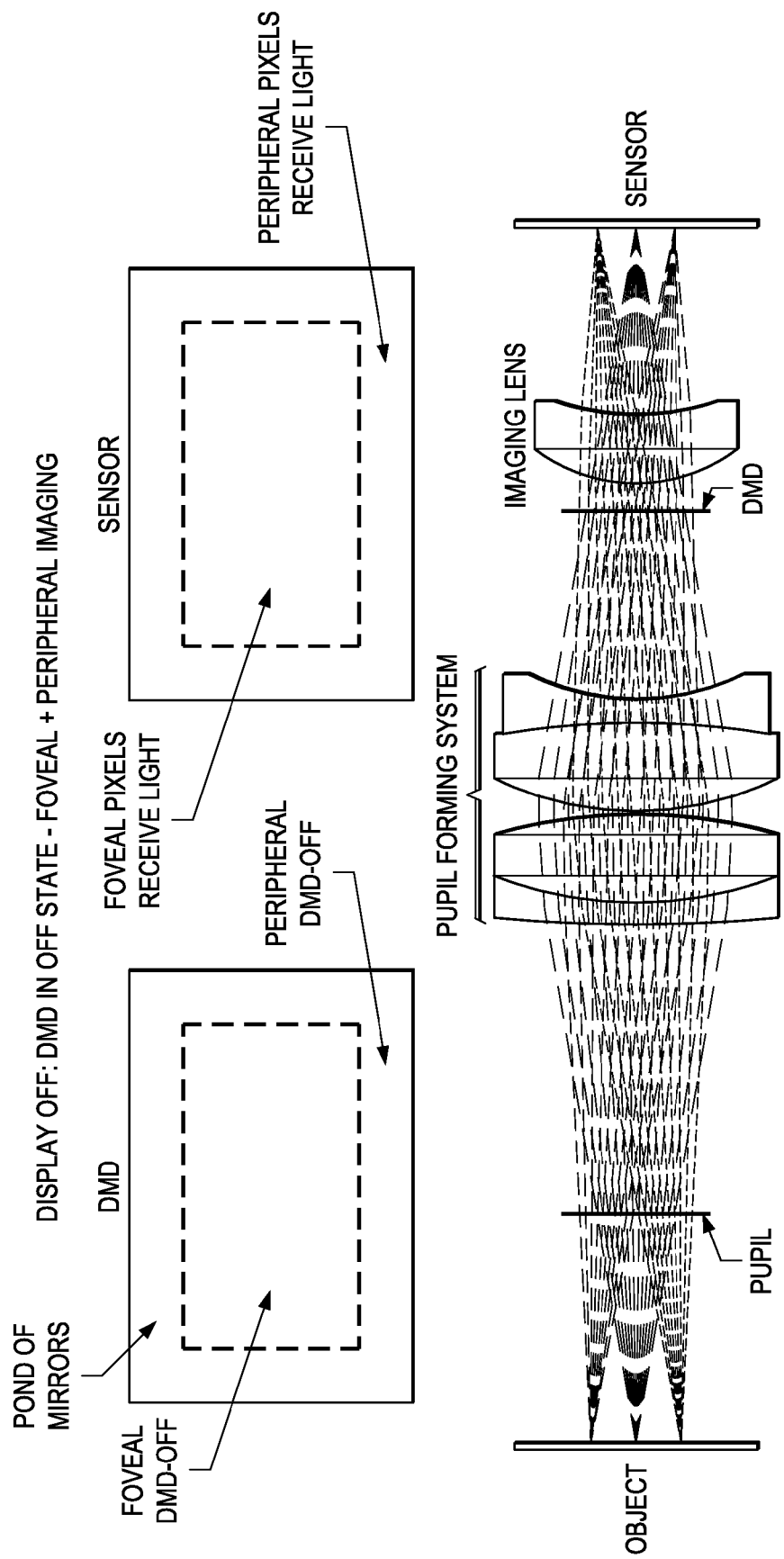
FIG. 5 illustrates the arrangement with the display in the OFF state.

FIG. 5 illustrates the optical path with the display in the OFF state. Here light forming the image of the eye is received via the DMD at a sensor such as the CCD/CMOS sensor illustrated in FIG. 2. In FIG. 5, for clarity the optical path is shown as a straight optical path. Those skilled in the art will appreciate, however, that the actual path will be bent as shown in FIG. 2. The fold around the DMD is omitted from the drawing. The imaging lens (camera optics) may be any suitable optics such as, for example, a compound lens used to focus light from the eye at the center and light from the seen at the periphery. As shown in FIG. 5, both the foveal mirror sub-array and the pond mirror sub-array mirrors are in the OFF state when the DMD is in the non-display mode. In such case, the sensor receives reflections of light from the eye at both foveal sensor pixels and peripheral sensor pixels.

Figure 6:
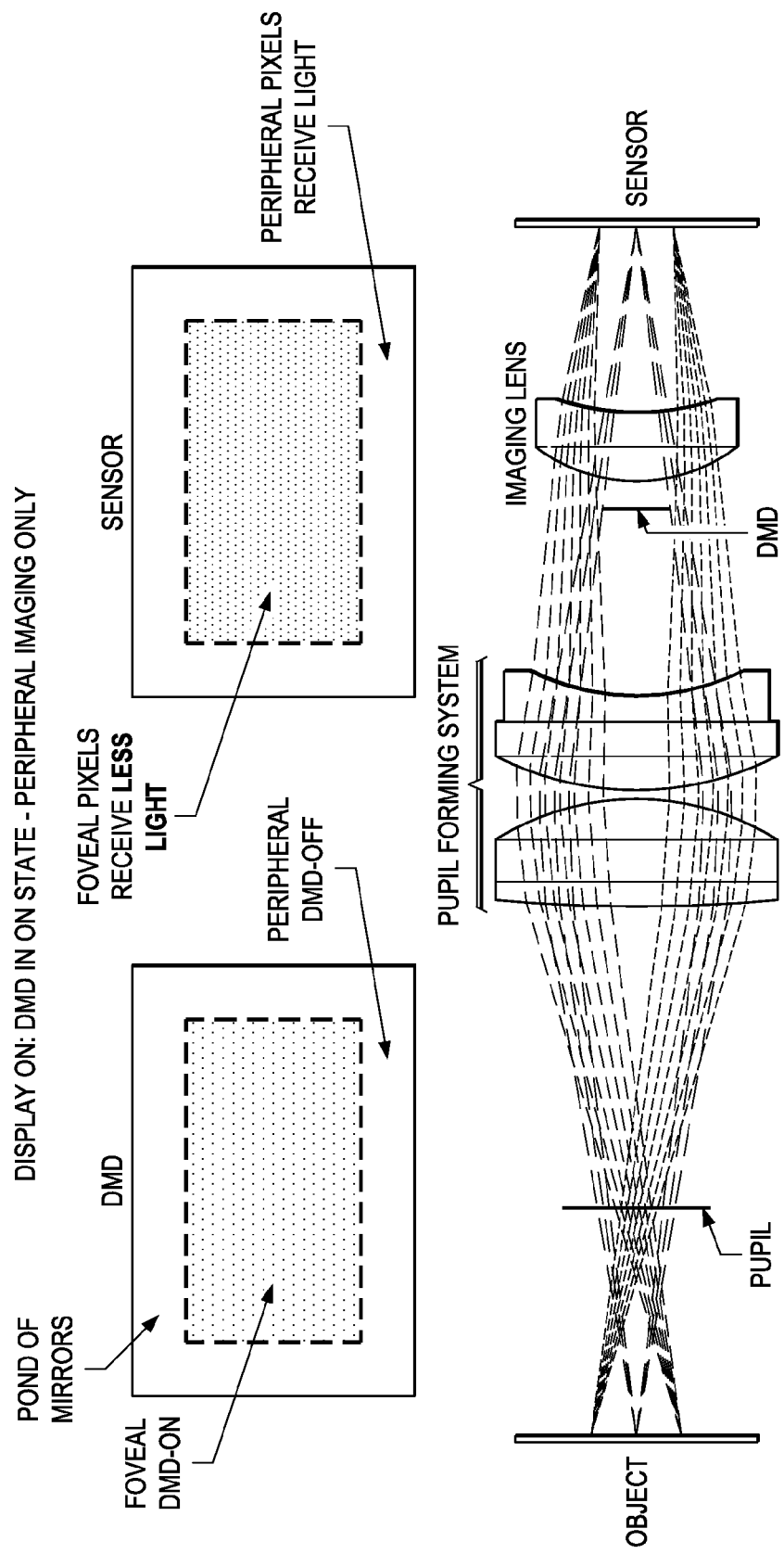
FIG. 6 illustrates the arrangement with the display in the ON state.

FIG. 6 illustrates the optical path with the display in the ON state. For the illustrated embodiment, the foveal DMD pixels now assume ON and OFF states according to the pulse-width modulation weighted time segment color sequences used to construct the display (within an eye integration time for each displayed image frame). The pond DMD pixels, however, may be continued in the OFF state. Accordingly, the sensor detects the same light from OFF state DMD pixels at the peripheral sensor pixels, but detects a reduction in light (reduced by the number of foveal DMD pixels switched from OFF to ON states) at the foveal sensor pixels.

Figure 7:
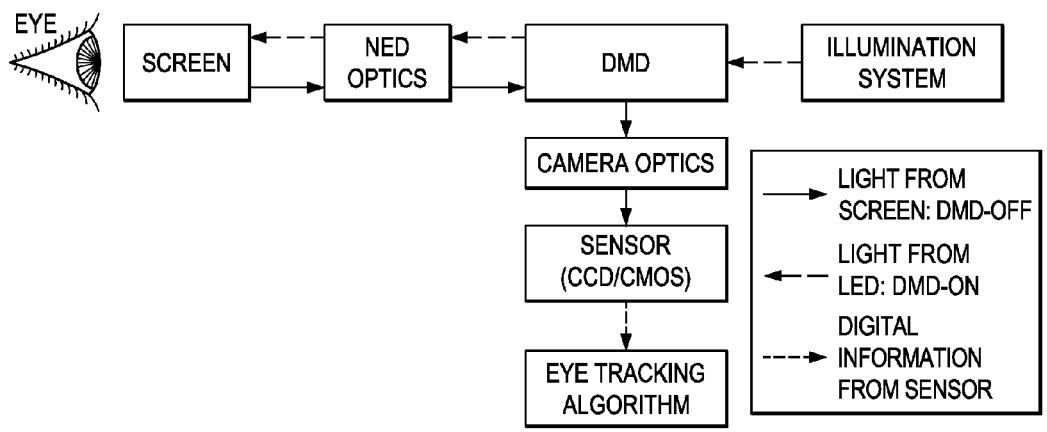
FIG. 7 illustrates example device embodiments.

FIG. 7 illustrates example device embodiments enabling simultaneous image display mode and eye tracking mode operation. For the display mode, light from the illumination system is modulated by the DMD and directed via near eye display optics (NED) to the user's eye for viewing. The image for each image frame is formed by switching the ON/OFF positions of individual pixel light modulators (micromirrors) of the foveal sub-array of modulators in synchronism with the incident light using weighted duty cycling determined based on, e.g., pixel color hue and intensity data received in an incoming video imaging signal. For the eye tracking mode, eye imaging light from the eye is passed via common elements of the same NED optics along a return path to the DMD and reflected via the camera optics to the sensor, from the totality of OFF state mirrors in the pond sub-array and from those mirrors in the foveal sub-array that are then in the OFF state. The sensed eye image information is then utilized for determination of eye position information by applying an eye tracking algorithm. As illustrated, the same NED optics serves both the function of pupil forming/collimating optics and pupil relay and expander (e.g. waveguide-based NED) and the function of image forming optics onto curved and micro-structures display target. Additional information on eye tracking algorithms is disclosed in D. W. Hansen & Q. Ji, "In the eye of the beholder: a survey of models for eyes and gaze," IEEE Trans. Pattern Analysis and Machine Intelligence, Vol. 32, Issue 3, pp. 478-500 (2010), the entirety of which is incorporated herein by reference.

Figure 8:
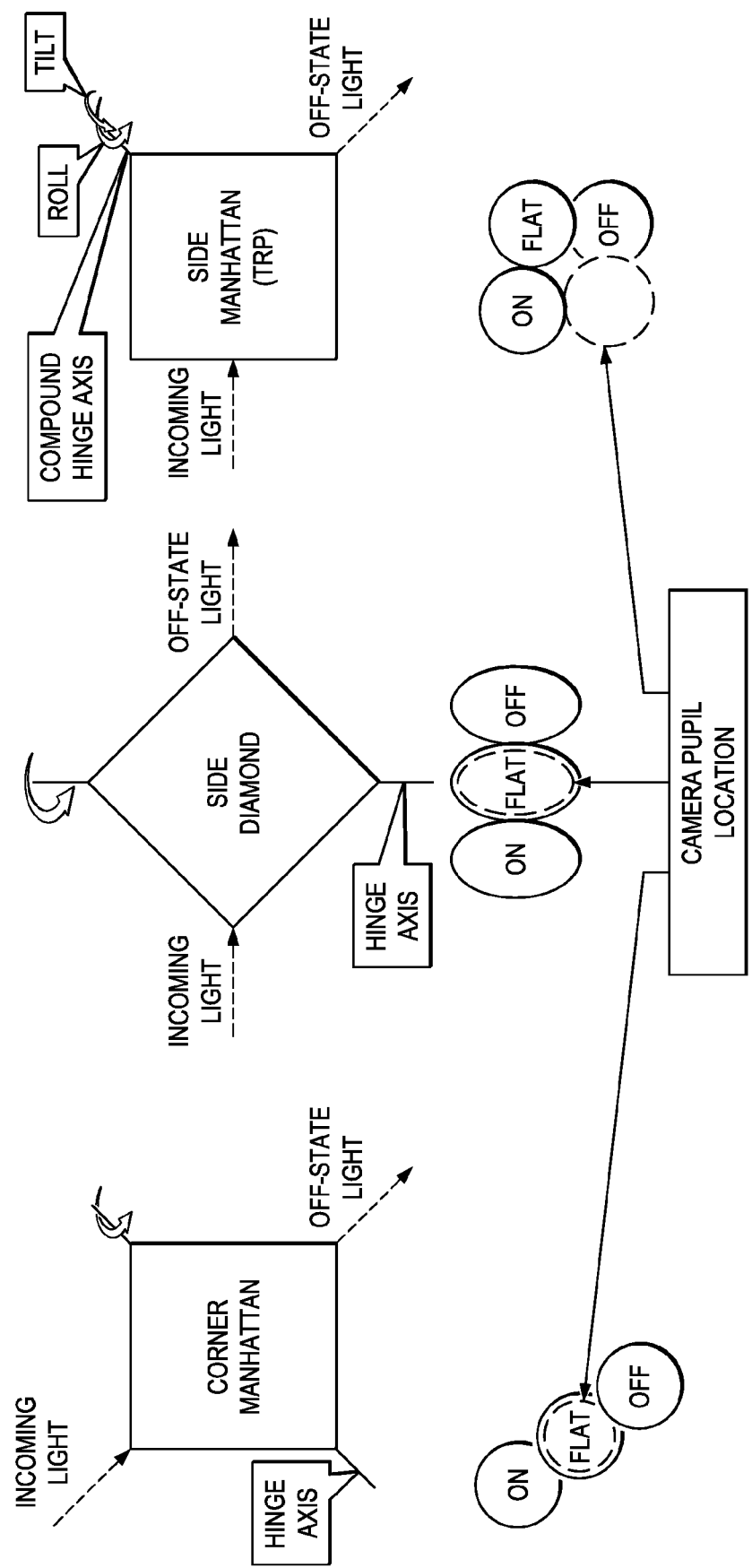
FIG. 8 illustrates different micromirror pixel examples.

FIG. 8 illustrates advantages of utilizing a TRP™ side Manhattan pixel element array over corner Manhattan and side diamond arrays. Hinge rotation between ON and OFF states is indicated by arrows. For the corner hinge axis (rotation about a diagonal) in a corner Manhattan arrangement array (element sides aligned in rows), light in the ON state received in the left upper corner is reflected perpendicularly up from the page toward the eye for display (viz., at 12 deg. tilt about axis). In the OFF state, light from the eye is received down into the page and reflected toward the lower right corner (viz., at 12 deg. tilt about axis). For the side diamond array (element diagonals aligned along rows), operation is similar. In the ON state, light enters the left corner and is reflected up from the page toward the eye. In the OFF state, light from the eye is received down into the page and reflected to the right toward the sensor. The TRP™ pixel, however, provides asymmetric display and eye imaging light paths. Incoming light with the pixel in the ON position comes in from the left and is directed upward toward the eye. In the OFF state, however, light directed into the page is directed to the lower right corner—not to the right (viz., at 120 deg. to the incoming beam, not at 180 deg.). This enables separate camera pupil location due to the asymmetric mirror tilt, and provides more space for additional camera optics due to a 17 deg. vs. 12 deg. tilt.

The disclosed embodiment provides simultaneous image display projection and eye position sensing. With the display mode set OFF, both foveal and pond mirrors reflect light from the eye toward the sensor. With the display mode ON, the pond mirrors and those foveal mirrors set to the OFF position reflect light from the eye toward the sensor. The pond of mirrors is available for use for peripheral imaging at all times in larger DMD devices wherein only the central (fovial) sub-array is used for display and the peripheral (pond) sub-array mirrors may be set to an OFF state at all times.

In another approach, the imaging can be done (for example, with smaller DMD devices) by "stealing" a frame or frame time segment periodically. This may be done, for example, by setting all mirrors to the OFF state for a brief time period for capture of an eye image. This may result in only momentary loss of brightness depending on image content.

The disclosed principles may be applied to systems with different architectures, as for example filed lens, prism, and/or direct imaging (no prism or field lens). The same principles may also be applied to systems which utilize a camera for augmented reality.

Figure 9:
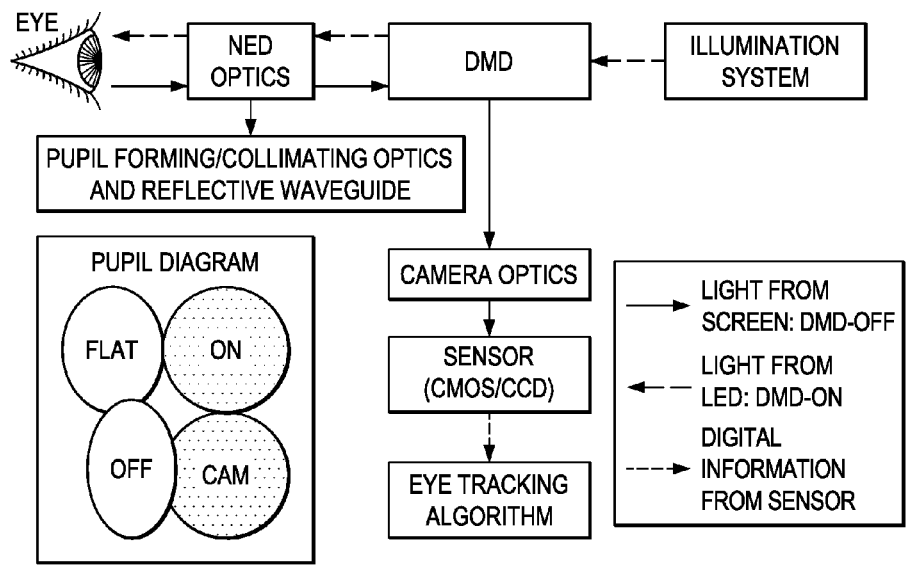
FIG. 9 is a block diagram similar to that of FIG. 2 or FIG. 7 of components usable in an implementation of the system illustrated in FIG. 1.
Figure 10:
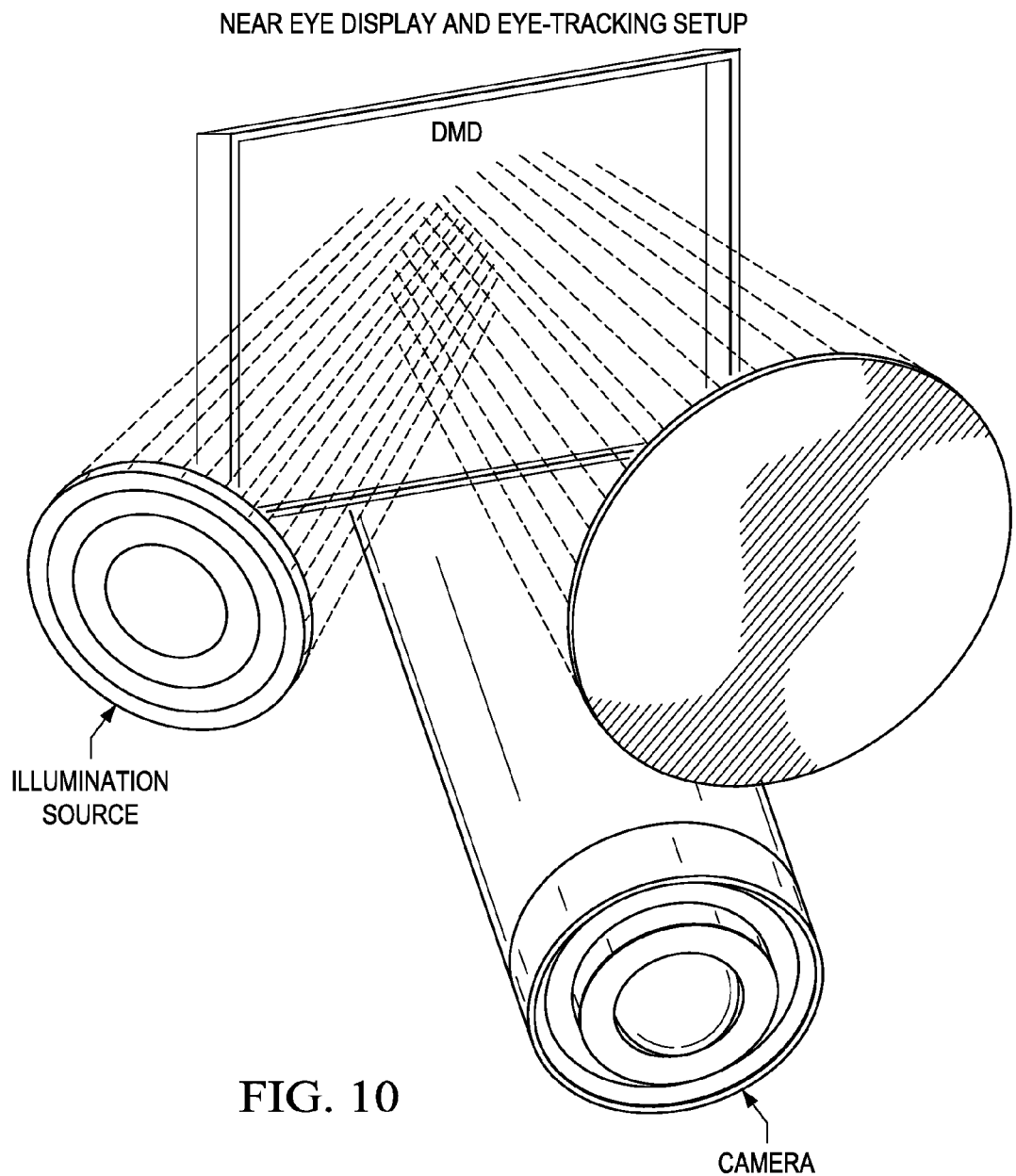
FIG. 10 is a view illustrating optical paths for the near eye display and eye-tracking setup.
Figure 11:
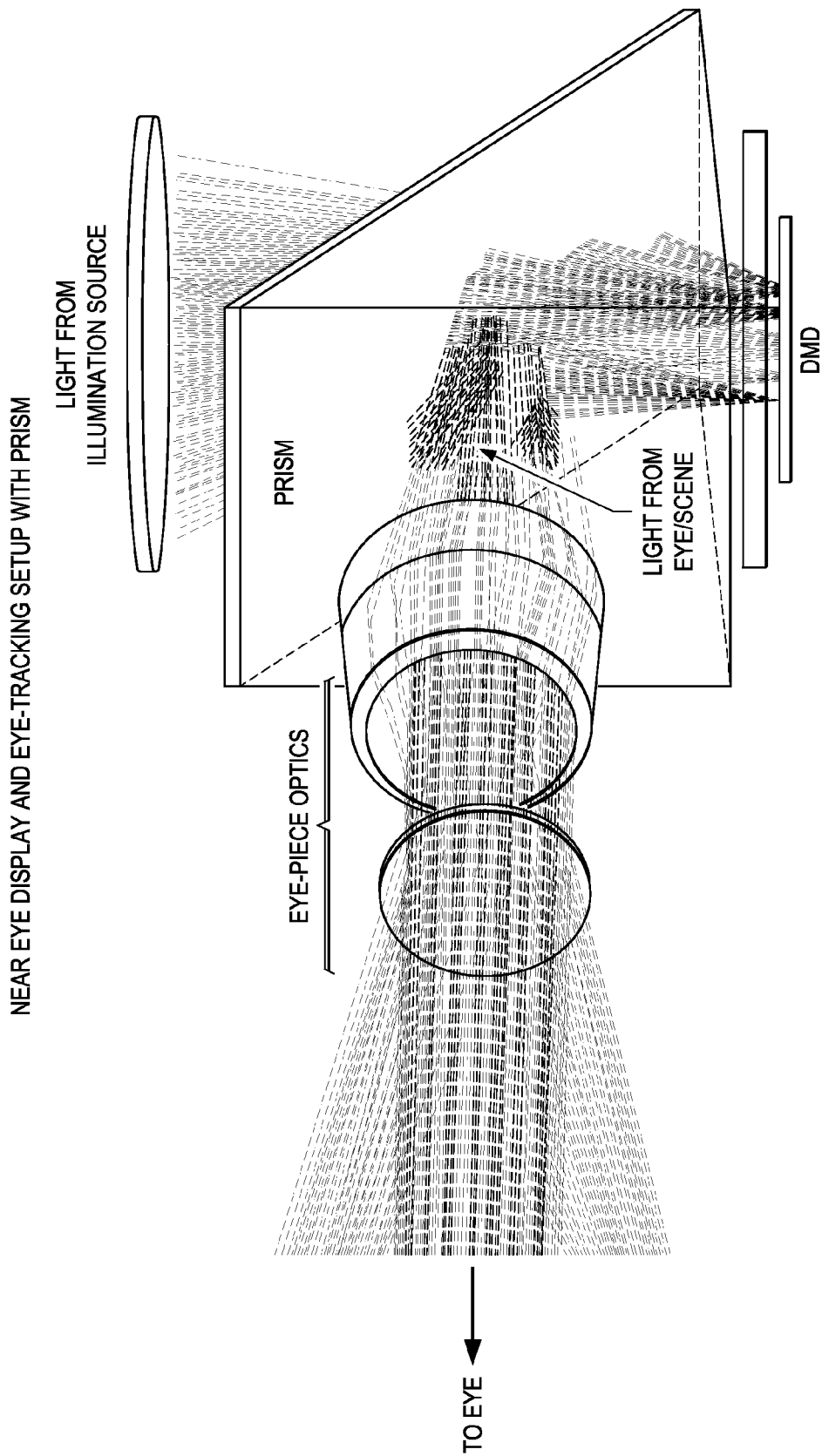
FIG. 11 is a view like that of FIG. 10 illustrating optical paths showing pupil enhancement using a prism.
Figure 12:
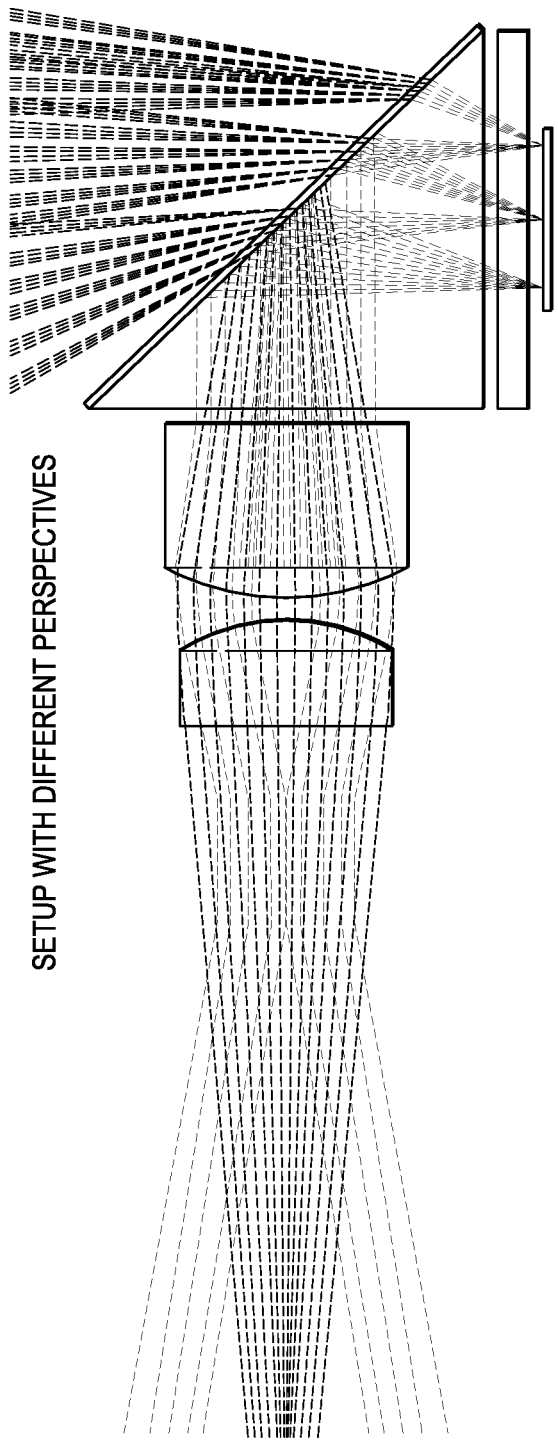

FIG. 9 is a block diagram similar to that of FIG. 2 or FIG. 7 of components usable in an implementation of the system illustrated in FIG. 1. FIG. 10 is a view illustrating optical paths for the near eye display and eye-tracking setup. FIG. 11 is a view like that of FIG. 10 illustrating optical paths showing pupil enhancement using a prism. FIGS. 12, 13 and 14 illustrate optical paths for the same setup from different perspective.

The disclosed principles are applicable to many near eye display system applications and functions. For example, eye tracking may be employed to implement a "sleep"/"wake" mode for conserving energy to lengthen battery life. Gaze tracking, blink detection, etc. may be used for interactive interfacing. The eye imaging function may be used for biometric identification (iris/retinal imaging, health screening, vision testing, etc. The imaging may also be used for ambient light sensing to control display brightness, change to night vision, etc. And, of course, data may be presented along with actual live, prerecorded or simulated scene viewing to present displayed data over images, etc.

Those skilled in the art will appreciate that many modifications may be made, and also that many other embodiments are possible, within the scope of the disclosed invention.

What is claimed is:

1. A device for eye gaze tracking, comprising:
   an illumination system;
   a spatial light modulator, including at least one light modulating element switchable between an ON position and an OFF position;
   near eye display optics;
   camera optics;
   a sensor;
   a first light path for directing illumination light toward an eye location, the first light path extending: from the illumination system via the at least one light modulating element if switched to the ON position; and continuing from the at least one light modulating element through the near eye display optics;
   a second light path extending: from the eye location through the near eye display optics and via the at least one light modulating element if switched to the OFF position; and continuing from the at least one light modulating element through the camera optics to the sensor; and
   a third light path for directing the illumination light away from the eye location, the third light path extending: from the illumination system via the at least one light modulating element if switched to the OFF position; and continuing from the at least one light modulating element along a different angular orientation than the second light path.

2. The device of claim 1, wherein the first light path and the second light path are coincident between the spatial light modulator and the near eye display optics and have a shared field of view.

3. The device of claim 1, wherein the spatial light modulator is a digital micromirror device (DMD).

4. The device of claim 3, wherein the DMD includes a foveal micromirror sub-array and pond micromirror sub-array surrounding the foveal micromirror sub-array.

5. The device of claim 3, wherein the DMD includes an array of micromirrors with a tilt and roll architecture.

6. A device for eye gaze tracking, comprising:
   an illumination system;
   a digital micromirror device (DMD) having an array of micromirrors with a tilt and roll architecture, including at least one micromirror switchable between an ON position and an OFF position;
   near eye display optics;
   camera optics;
   a sensor;
   a first light path for directing illumination light toward an eye location, the first light path extending: from the illumination system via the at least one micromirror if switched to the ON position; and continuing from the at least one micromirror through the near eye display optics;
   a second light path extending: from the eye location through the near eye display optics and via the at least one micromirror if switched to the OFF position; and continuing from the at least one micromirror through the camera optics to the sensor; and
   a third light path for directing the illumination light away from the eye location, the third light path extending: from the illumination system via the at least one micromirror if switched to the OFF position; and continuing from the at least one micromirror along a different angular orientation than the second light path.

7. The device of claim 6, wherein the DMD includes a foveal micromirror sub-array and pond micromirror sub-array surrounding the foveal micromirror sub-array.

8. A method for eye gaze tracking, comprising:
modulating light from an illumination system using a digital micromirror device (DMD) that includes an array of micromirrors;
placing at least a first subset of the micromirrors in an ON position;
placing at least a second subset of the micromirrors in an OFF position;
directing illumination light along a first light path toward an eye location, the first light path extending: from the illumination system via the first subset; and continuing from the first subset through near eye display optics;
directing eye imaging light along a second light path extending: from the eye location through the near eye display optics and via the second subset; and continuing from the second subset through the camera optics to the sensor to create sensed eye image information;
using the sensed eye image information from the sensor to determine eye position; and
directing the illumination light along a third light path away from the eye location, the third light path extending: from the illumination system via the second subset; and continuing from the second subset along a different angular orientation than the second light path.

9. The method of claim 8, wherein the DMD includes a pond subset of micromirrors around a periphery of a foveal subset of micromirrors.

10. The method of claim 9, wherein the second subset of the micromirrors includes all of the pond subset of micromirrors.

11. The method of claim 9, wherein the second subset of the micromirrors includes all of the pond subset of micromirrors and all of the foveal subset of micromirrors.

12. The method of claim 9, wherein the illumination light is directed along the first light oath via the foveal subset of micromirrors simultaneously with directing the eye imaging light along the second light path via the pond subset of micromirrors.

13. The method of claim 8, wherein the micromirrors of the DMD have a tilt and roll architecture.

14. The method of claim 8, wherein the first light path and the second light path are coincident between the DMD and the near eye display optics and have a shared field of view.

* * * * *